United States Patent [19]

Halsall et al.

[11] 4,309,758
[45] Jan. 5, 1982

[54] DRIVERLESS VEHICLE AUTOGUIDED BY LIGHT SIGNALS AND THREE NON-DIRECTIONAL DETECTORS

[75] Inventors: James R. Halsall, Runcorn; Michael H. Larcombe, Coventry; James R. Robertson, Northwich; Mark A. Rogers, Chester, all of England

[73] Assignee: Imperial Chemical Industries Limited, London, England

[21] Appl. No.: 62,698

[22] Filed: Aug. 1, 1979

[30] Foreign Application Priority Data

Aug. 1, 1978 [GB] United Kingdom ............... 31849/78

[51] Int. Cl.³ ..................... G06F 15/20; B62D 11/04
[52] U.S. Cl. .................................. 364/424; 364/436; 364/449; 180/169

[58] Field of Search ............... 364/424, 436, 410, 449; 180/169

[56] References Cited

U.S. PATENT DOCUMENTS

| 3,563,327 | 2/1971 | Mier ................... | 364/424 X |
| 4,028,533 | 6/1977 | Matsubara ............ | 364/424 X |
| 4,039,782 | 8/1977 | Burckhardt et al. .......... | 364/424 X |
| 4,119,900 | 10/1978 | Kremnitz ................... | 364/424 X |

Primary Examiner—Edward J. Wise
Attorney, Agent, or Firm—Cushman, Darby & Cushman

[57] ABSTRACT

An unmanned vehicle capable of being automatically guided towards a predetermined destination by the geometrical computation of light signals received by at least three omnidirectional detectors on-board the vehicle. Useful in restricted areas such as automatic warehouses and loading bays.

11 Claims, 4 Drawing Figures

Fig. 1  UNMANNED VEHICLE

DRIVERLESS VEHICLE AUTOGUIDED BY LIGHT SIGNALS AND THREE NON-DIRECTIONAL DETECTORS

This invention relates to an unmanned vehicle guided towards a goal particularly to a vehicle guided by light signals.

Driverless vehicles are in common use especially in automatic warehouses and many are guided along pre-determined paths which are either wires embedded in the floor or light beams marking out the track to be followed.

We now provide a navigation and guidance system which allows a roving automatic vehicle to be guided by means of on-board light sensitive detectors responsive to collimated beams of light emitted in all directions from stations of known position.

According to the present invention we provide a vehicle capable of automatous guidance towards a pre-determined destination comprising at least three light sensitive detectors mounted on the vehicle in a triangular array and each detector being adapted to receive omnidirectionally light signals from at least one fixed station having a known position relative to that of the destination, and a computer electrically connected to each detector capable of interpreting information from the detectors relating to the position of each fixed station the computer also having the capability of influencing the mechanical controls for the movement of the vehicle in such a way that the vehicle may be guided towards the pre-determined destination.

If three detectors on the vehicle observe the light from a single fixed station the computer will be able to assess the distance of the vehicle from that station but there is insufficient information to determine the bearing of the vehicle from that station unless the direction of each beam is known. If two or more fixed stations can be observed the processor will have enough information to navigate the vehicle but this is not always possible in a crowded environment where there are many obstructions, for instance in a warehouse or near to loading bays.

Therefore, we prefer to use the vehicle in combination with fixed stations (or beacons) emitting light which carries its own message concerning the direction of the beam with respect to a fixed axis. If such a message, conveniently coded in the character of the light beam for example, is interpreted by each of the three detectors on board the vehicle, navigation of the vehicle is possible from the observation of a single light source (see FIG. 4).

We prefer to have a single light station which can be observed from all points over the area of operation of the vehicle but if this is impossible a plurality of stations each identifying themselves to the detectors of the vehicle may be used and arranged in positions such that one at least is always visible to the detectors on board the vehicle. In order to send messages about its own bearing the beam emitted is preferably a beam rotating about an axis, usually a vertical axis, the character of the beam changing in some way (e.g. frequency modulation or vertical length of slit or time base of pulsation) as the beam sweeps around the axis and thereby traverses a circle of compass points. The detectors on board the vehicle are preferably such as to interpret the changes in character and identify the direction of each beam detected: this minimises the number of light sources necessary to work in combination with the vehicle for an automatic guidance system.

If the vehicle is moving and the three detectors do not receive their light signals simultaneously, because for instance the beam is sweeping round the circle of compass points at a slow rate, some error will be introduced into the geometrical calculation thereby. It is difficult to correct this error and therefore we prefer to minimise it by arranging nearly simultaneous reception by all detectors. This may be achieved when a rotating beacon is used by having fast rotation for example speeds of greater than 600 rpm.

The information from the detectors is transmitted electrically to the computer from at least three detectors, the computer thus having sufficient information to be able to compute the position and orientation of the vehicle relative to the fixed station and the fixed axis. The position of the predetermined destination is known to the computer (this may be fed in previously and kept in store) and therefore the computer is able to solve the geometrical problem and direct the vehicle towards that destination.

Even if the line joining two of the three detectors is collinear with the light beam there will be no uncertainty in the navigational information provided the angular placements of the detectors on the vehicle are known to the computer.

For the navigation by a geometrical interpretation of the light signals it is convenient to generate a grid or map reference system for all points in a local area of operation for the vehicle. The fixed station emitting the signal, the desired destination, the vehicle position computed from the light signals and the route to be taken to reach the target may be all expressed in terms of the same set of map references, digitally coded so that they can be handled by the computer. Conveniently the computer is such as to be able to store the map references of all locations in the area of operation of the vehicle in its memory.

The light signals from the fixed station are preferably generated by means of a collimated beam or other suitable intense directional light source for example a laser or a xenon-flasher backed by a parabolic mirror. If there are a plurality of light sources seen by the detectors it is desirable that each one identifies itself by the light emitted for example by the colour/wavelength of the light emitted or some other characteristic property interpretable by the detector as the light is received.

The light source is preferably constructed so that the collimated beam can sweep a horizontal circle synchronously with a device for imparting a directional message in the beam for example the device may be a Gray-code disc which operates a pulse modulator so that the pulse modulation indicates the bearing of the beam emitted and this coded information may be interpreted by the detectors on the vehicle.

If the light signals emitted from the fixed station do not carry directional information (for example if the light source does not rotate but merely shines in all directions) or if the detectors cannot directly interpret or fail to interpret information concerning the bearing of one light signal it will be necessary for the vehicles detectors to observe the light from more than one fixed station simultaneously. Then by observing two beams, each detector is able to transmit to the computer information concerning the angles subtended by the known distance between the two stations and from this angle and that of the triangular spacing of the three detectors the bearing of each light source may be computed with respect to the axis of the vehicle. With this information the computer can compute the map reference of the orientation of the vehicle and again determine the direction to be taken towards the predetermined destination. From successive determinations of this type the computer navigates the vehicle and guides it towards that destination.

It will be appreciated that the signals from two beams if not coded for directional information (a coded system is preferred because observations of only one beacon are necessary) may be generated by reflective or fluorescent objects illuminated by general background lighting or preferably illuminated specifically from a light source mounted on the vehicle. The detectors may then observe two different reflectors at known map references or they may observe the extremities of one large reflector provided the positions of each is known to the computer at the time of the observation of the reflected beams by the detectors on the vehicle.

Thus a variety of different systems may be employed and the most convenient embodiment may be selected for the vehicle depending on the exact function intended or perhaps the distance over which the vehicle is required to work automatically. The advantage of using light signals rather than radio wavelengths or sonar signals are that it is easier to distinguish the true signal from extraneous interference and to contain the system within a defined boundary opaque to the true signals. Accurately collimated beams are easier to obtain and use in geometrical computation with light than with radio or sonar beams.

It is a geometrical system of navigation that is employed with the vehicles of this invention i.e. a system not dependent on knowing the speed of light e.g. as radar requires, but only the directions of the beams observed. The advantage of this system is that the vehicle does not need to employ a compass on board with its attendant errors due to magnetic surroundings or vibration of the vehicle.

By light we mean electromagnetic waves readily collimated into directional beams, our preferred system having e.g. wavelengths from 300 nm to 3,000 nm including visible, infra-red and ultraviolet wavelengths. Visible light is more easily generated, controlled and observed for example when tested by maintenance personnel and we prefer to use visible wavelengths whenever possible.

The detectors on the vehicle are required to be capable of characterising the light signals and thereby using detectors, either singly or working in combination, the computer will be able to determine the bearing of the light source observed. If the light signal itself carries this message the detector (and the computer ultimately) must be adapted to receive and interpret the message. If there is no message carried by the beam of light each detector must search for another beacon of known position and measure the angle between the signals from the two. Then in combination with the same information from the second detector the bearings of the light signals can be characterised.

The use of three detectors only on the vehicle provides a workable arrangement in all positions and orientations of the vehicle and arrangements of light sources: it has the advantage of a minimum number of components used with consequent advantages in the simplicity of processing the information therefrom. It is possible for two of the detectors and one light source to be collinear or nearly so and in this arrangement the mode of computation for the navigation must change slightly. However, there is still sufficient information available from the known angles and distances between the detectors on the vehicle and the angle between the signal beams to compute the position and orientation of the vehicle. A superior embodiment of the invention might be to have at least four detectors mounted in the vehicle preferably in a quadrilateral positioning, three of which are in use for navigation at any one time. If any detector becomes inoperative or in a shadow so that it cannot observe a light source, switching would automatically operate on the vehicle to use the three most appropriate detectors at any time.

The vehicle is preferably a wheeled vehicle for example, a three or four wheeled truck conveniently driven by an internal combustion power unit mounted on the vehicle or by one or more electric motors. The vehicle may advantageously be a goods-carrying truck most likely a fork-lift truck and may be of a conventional design for such vehicles except for the components specified as essential for this invention. Thus the steering and speed controls may be conventional mechanisms for such trucks except that usual manned operation of the controls is overtaken by the instructions from the computer and other subsidiary power units, e.g. small electric motors or hydraulic pistons are provided capable of putting into operation the computers instructions and substitute for the normal functions of a driver.

It is envisaged that a useful outlet for the operation of an unmanned vehicle as described herein would be in the carriage of goods to and fro in an automatic warehouse, goods-yard or storage depot and between such a store and a road or rail transport truck which would be loaded automatically thereby. The unmanned vehicles according to the invention need to be capable within the boundaries of the navigation system, of picking up loads from any desired source location, transporting those loads and setting down those loads at any desired destination. Typically the loads may be located on conveyor belts, other vehicles such as road or rail wagons, storage racking, stillages or simply stacked on the floor.

Preferably the loads will be assembled on pallets or placed inside containers capable of being picked up, transported and set down by means of fork lift trucks, thus enabling the unmanned vehicle to exploit any of the well known systems of fork lift truck technology.

Unmanned vehicles are known especially in automatic warehouses and factories and are commonly guided along pre-determined paths either by running on rails, by means of electric wires embedded in the floor or by light beams making out the track to be followed.

These known systems commonly avoid collision between vehicles either by signalling techniques which make one section exclusive to a particular vehicle or by proximity detectors arranged to halt a moving vehicle when it closely approaches another vehicle on the same pre-determined path. The vehicle thus halted must wait for the other vehicle to complete its task of loading or un-loading and move on, before said halted vehicle can continue its desired journey along the predetermined path with consequent delay.

It is advantageous to avoid such delays by employing freely roving vehicles which would not be constrained to predetermined paths and having detected a potential collision could automatically select an alternative course along which to navigate to the desired destination: such a vehicle we have described above.

According to another aspect of the invention we provide the combination of at least one unmanned vehicle as described and specified herein before, preferably a vehicle capable of picking up and setting down predetermined loads, and at least one light source capable of emitting a collimated beam detectable by the vehicle situated at a vantage point in an area of operation of the vehicle, the area being mapped and all map references placed in the memory of the computer on board the vehicle.

A further aspect of the invention provides in addition a supervisory computer capable of operating a communications link to all said vehicles operating within the area mapped and capable of issuing commands to each vehicle operating in this area.

Various embodiments of the unmanned vehicles, include barges floating on water, hovercraft, track laying vehicles steered by means of the tracks as employed in military tanks, and the more common types of wheeled vehicles steered by means of the wheels.

The preferred embodiment would be a four wheeled vehicle, normally steered by the front wheels, in accordance with known motor vehicle practice, but for close manoevering in confined spaces such as the aisles between rows of warehouse racking, the preferred embodiment would include the provision of a limited degree of auxilliary steering of the rear wheels.

Whenever a plurality of unmanned vehicles are operating in any defined area it is desirable for some form of collision avoidance system to be in operation. As we have indicated, we are not constrained by the use of rails, wires or other set pathways and therefore our collision probabilities are lower. Nevertheless, for efficient operation each vehicle is preferably fitted with an individual collision avoidance system for example a reflective device which will prevent the vehicle colliding with either another moving vehicle or a stationary object. These systems can be any of the many types well known in the art such as radar, sonar, inductive and capacitive detectors, pressure sensitive switches, other tactile devices or light reflectors.

On detection of a potential collision hazard by means of the avoidance system a signal would be sent to the unmanned vehicles' control system which could then determine if the vehicle should be halted or if an alternative collision free route would be available to the desired destination. Thus the navigational control from the computer on-board the vehicle would be dominated by a collision avoidance control and only take over navigational control once more when the danger of collision was past.

Additionally we foresee the need for some form of close proximity control also overriding the main navigational control in order to accurately align the vehicle and correctly position it for loading and unloading. This may take the form of conventional tactile sensing devices because for loading and unloading the vehicle will be close to another object or another surface on which the load is already or is soon to be supported.

The unmanned vehicles will be equipped with a self contained driving unit, typically an electric storage battery and drive motors, or an internal combustion engine and fuel tank.

In order to conserve fuel with either of said driving units it is desirable that loaded vehicles should command priority over unloaded vehicles. To establish said priority each unmanned vehicle should be equipped with a weight measuring transducer enabling load comparisons to be made.

Therefore according to another aspect of the invention there is provided a combination of
 (a) at least one unmanned vehicle as hereinbefore described
 (b) a computer at a fixed location for the supervisory control of the performance of the unmanned vehicle
 (c) a communications link between the supervisory computer (b) and the vehicle (a) to enable the computer to command the unmanned vehicle to perform a task involving transport between predetermined locations
 (d) and a navigation system employing the geometry of collimated beams operable by the vehicle whereby the task commanded by communications link (c) may be performed without further reference to the computer (b).

The invention in all its aspects may be better understood by consideration of a preferred embodiment which will now be described by reference to FIGS. 1–4.

Figure 1:
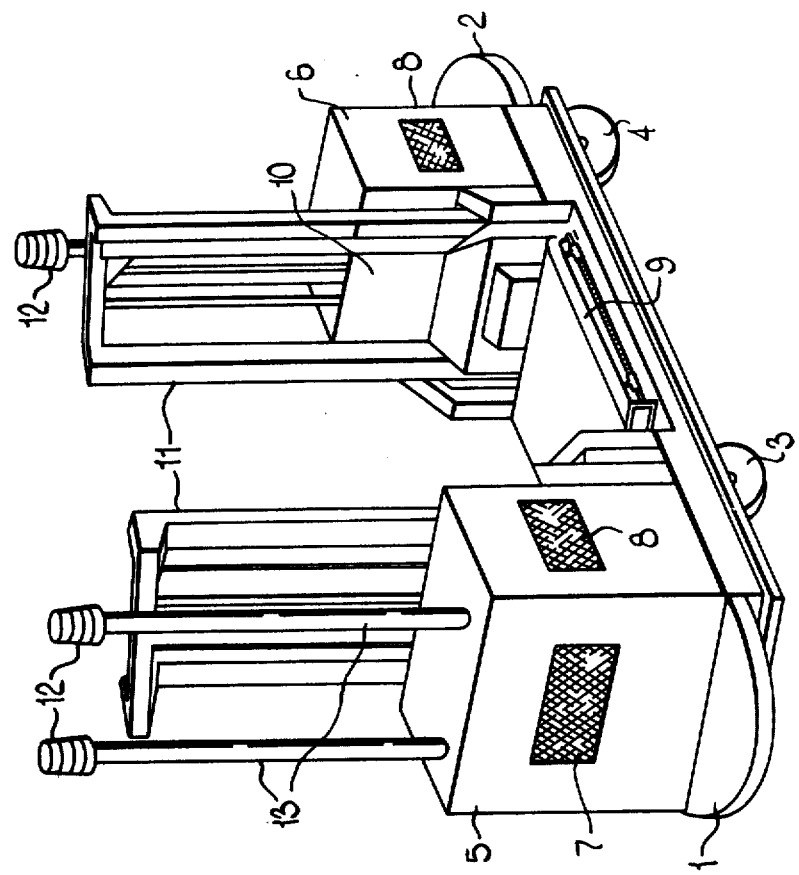
FIG. 1 is a perspective sketch of the unmanned vehicle showing the component parts.

The vehicle shown in FIG. 1 has front and rear bumpers 1, 2 optionally fitted with switching to stop the vehicle if there is any impact of either bumper with other objects. Front wheels, 3, are fitted with the main steering control but power driven rear wheels 4, are also capable of being steered to increase manoevrability of the vehicle in confined spaces. Front and rear equipment enclosures 5,6 house electric storage batteries, drive motors, fuel tank (if vehicle powered by an internal combustion engine) and control systems for drive motors, steering mechanisms and load positioning. In addition a computer with a memory and a radio-communications link to a supervisory computer (not on the vehicle) are also contained in these equipment enclosures. Panels 7, 8 on the front and sides of the equipment enclosure contain close-proximity detectors which may be tactile sensors sonar sensors or some other conventional form of accurate alignment of the vehicle with other surfaces for example loading and unloading stations.

A load-carrying platform 9 may be raised by lifting mechanism 10 sliding up and down pillars 11 which are constructed as a framework fore and aft of the load platform. The platform may be projected sideways in order to set down or pick-up a load. Navigational detectors 12 are mounted on masts 13 in order to give them a view of beacons uninterrupted by the body of the vehicle.

Figure 2:
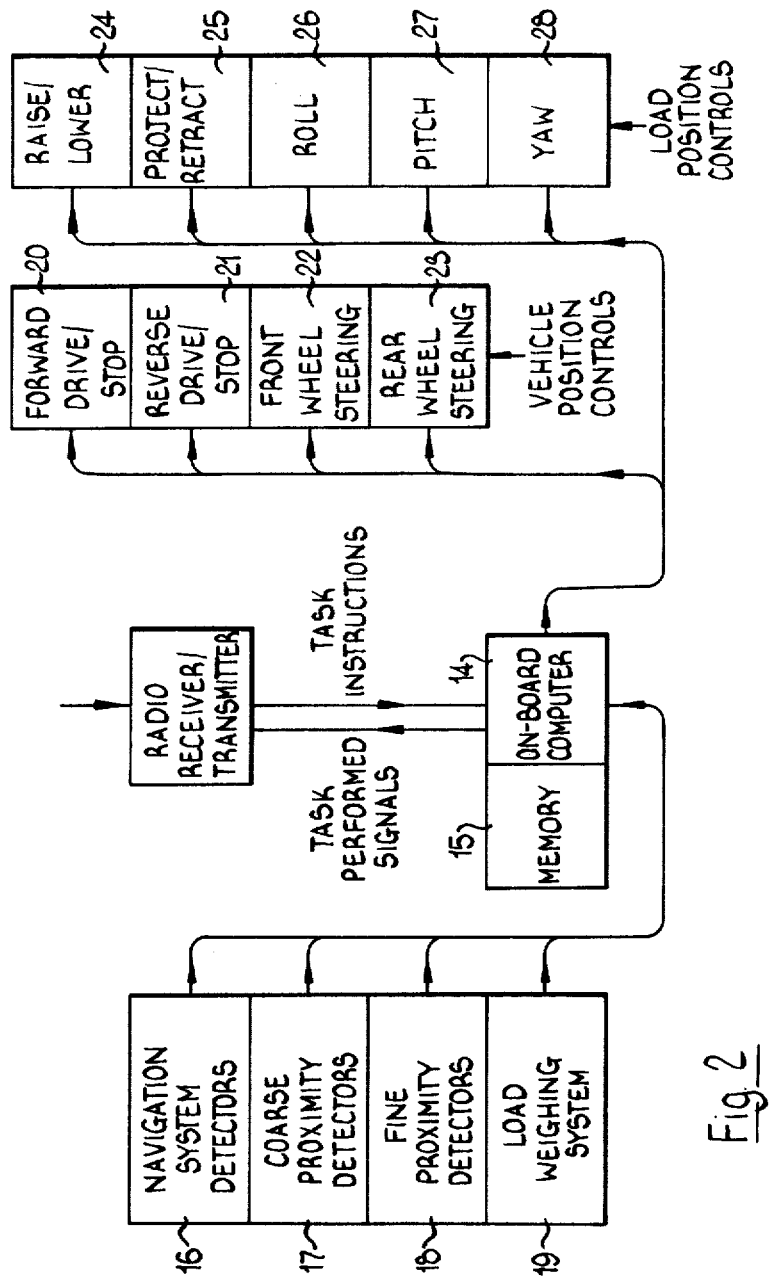
FIG. 2 is a block diagram of the computer control system for operation of the unmanned vehicle.

In FIG. 2 communication between the unmanned vehicle and a remote supervisor (not shown) from whom the unmanned vehicle receives instructions to perform tasks, is achieved by means of a radio receiver/transmitter but other means of communication such as inductive loops or sound waves could be employed.

The task instructions (which typically would specify a source location from which a load is to be picked up and a desired destination to which that load is to be transported and set down) provide one set of inputs to the on-board computer 14 and are stored in the computer memory 15 which also contains a map of the operational area of the vehicle. Additional computer inputs from navigation detectors 16, coarse and fine proximity detectors 17 and 18 and the load weighing system 19 are used to calculate a first collision free course to the source location, and the vehicle automatically travels to that location by means of vehicle position control systems 20, 21, 22 and 23. On arrival at the source location the vehicle is halted and the load picked-up by means of the load position controls 24, 25, 26, 27 and 28.

A second collision free course from source to destination is then calculated by the computer in conjunction with the instructions stored in memory 15 and data inputs 16, 17, 18 and 19, and the vehicle automatically travels to that desired destination by means of vehicle position controls 20, 21, 22 and 23.

On arrival at the desired destination the vehicle is halted and the load set-down by means of the load position controls 24, 25, 26, 27 and 28.

On completion of this task the computer generates a "task-performed" signal which is transmitted back to the supervisor via radio/transmitter.

Figure 3:
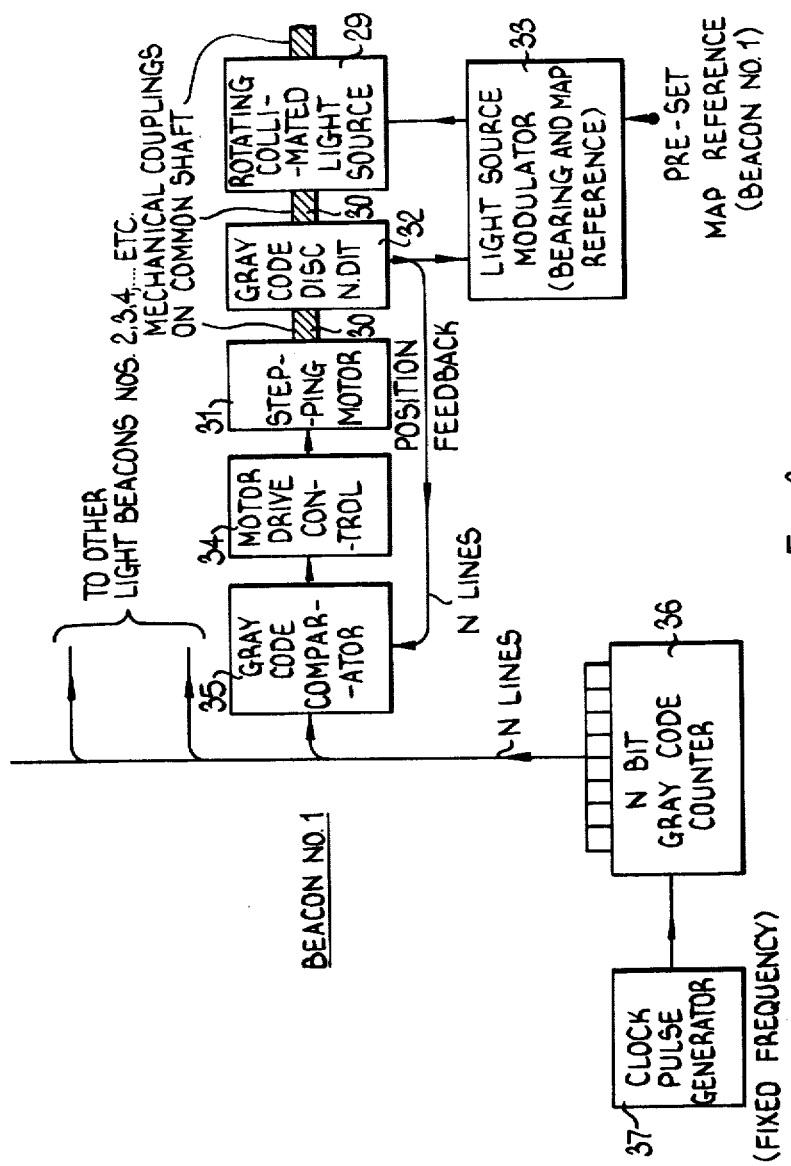
FIG. 3 is a block diagram of a light beacon assembly and the operation thereof in relation to the control system.

In FIG. 3 collimated light source 29 is coupled by mechanical couplings 30 to a stepping motor 31 and a Gray code disc 32, such that the motor light source and code disc rotate in unison. The coded output of Gray code disc 32 corresponds to the direction of the beam of light from source 29 of beacons with respect to a selected datum direction. The datum direction is constant for all beacons used in the fiducial array defining the navigable region.

The output of the Gray code disc 32 forms a first input to a light source modulator 33 which has a second input corresponding to the map-reference defining the location of the beacon. The output of modulator 33 is fed to the light source 29 to provide coded-data corresponding to the location of the beacon and the direction of the beam of light emitted therefrom.

In the unmanned vehicle navigation system according to the invention, because of obstructions and boundaries, most systems will employ a plurality of beacons which must all rotate synchronously both in speed and in phase. To achieve this synchronisation stepping motors 31 are arranged as components in a feed back loop comprising motor drive control 34 and Gray code comparator 35.

Gray code comparator 35 has a first input representing actual angular rotation from Gray code disc 32 and a second input representing desired angular rotation from Gray code counter 36. Any difference between the actual and desired angular rotations is detected by comparator 35 and eliminated by signalling the motor drive control 34 to advance or retard stepping motor 31.

Gray code counter 36 is fed with a continuous pulse train from clock pulse generator 37 at a fixed frequency.

The output of Gray code counter 36 increases from zero to full scale as pulses are received and overflows to zero once the full scale value has been reached, thus producing a cycle of Gray code values corresponding to those of the rotating Gray code disc 32.

The Gray code counter 36 provides the desired angular rotation signal to each of the rotating light beacons.

Figure 4:
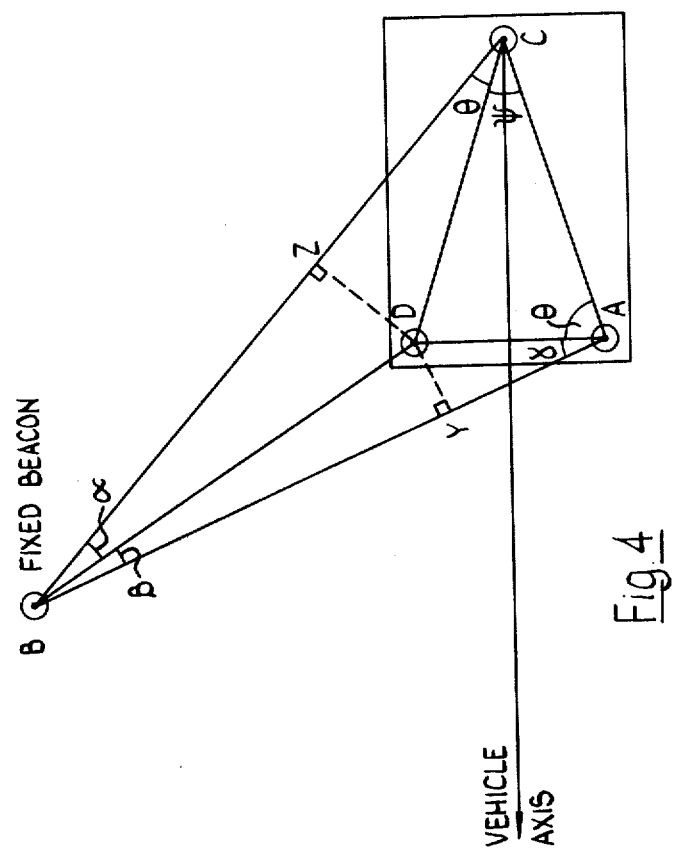
FIG. 4 is a geometrical drawing of the navigational information to be computed on-board the vehicle.

In FIG. 4, A, C and D are three omni-directional photo-detectors located at fixed positions on an unmanned vehicle. B is a beacon located at a known position and emitting a beam which carries directional coded information. The distances AC, AD and CD are known and the angles $\alpha$ and $\beta$ may be obtained from the information given by the detectors during one beacon rotation. The position and bearing of the unmanned vehicle can then be calculated from the equations hereinafter disclosed.

$$BD = \frac{YD}{\sin \beta} = \frac{ZD}{\sin \alpha}$$

Hence $\quad \dfrac{YD}{ZD} = \dfrac{\sin \beta}{\sin \alpha}$ but $\quad YD = AD \sin \gamma$ and $ZD = CD \sin \phi$ hence $\quad \dfrac{AD \sin \gamma}{CD \sin \phi} = \dfrac{\sin \beta}{\sin \alpha}$ therefore $\quad \dfrac{\sin \gamma}{\sin \phi} = \dfrac{CD \sin \beta}{AD \sin \alpha} = M$ say ($\alpha$ & $\beta$ are known from the interpreted directional code in the beams)

therefore $\quad \sin \gamma = M \sin \phi$

Now in $\triangle ABC$ from the fixed placing of the detectors)

$180° = (\alpha + \beta + \theta + \psi + \phi + \gamma)$ ($\theta$ and $\psi$ are known)

Hence $\quad \phi + \gamma = 180° - (\alpha + \beta + \theta + \psi) = \kappa$ say Hence $\quad \phi = \kappa - \gamma$ therefore $\quad \sin \gamma = M \sin \phi = M \sin (\kappa - \gamma)$ or $\quad \sin \gamma = M \sin \kappa \cos \gamma - M \cos \kappa \sin \gamma$ or $\quad \sin \gamma (1 + M \cos \kappa) = \cos \gamma \, M \sin \kappa$ therefore $$\tan \gamma = \frac{\sin \gamma}{\cos \gamma} = \left[ \frac{M \sin \kappa}{1 + M \cos \kappa} \right]$$

Hence tan $\gamma$ and thus $\gamma$ can be determined. If the absolute compass bearing of any one of the beams BA BC or BD is known the location and bearing of the vehicle axis can be calculated.

What we claim is:

1. A vehicle having means for determining its position and orientation with reference to a final station, in combination with a beacon located at said fixed station; the beacon having a light source for emitting the light in diverging directions over an area in which the vehicle moves, and means for encoding the light with directional information wherein the light emitted from the beacon in one direction is detectably different from that emitted in any other direction; the vehicle having at least three triangulated light-sensitive detectors mounted to intercept light from the beacon at all orientations of the vehicle within said area, decoding means to read the directional information encoded in the light received by each detector and thereby learn the direction in which the light intercepted by each detector was emitted from the beacon, and means to calculate the position and orientation of the vehicle from the directional information so learned.

2. A combination of vehicle and beacon as claimed in claim 1 wherein the light is emitted from the beacon as a beam which scans over the area in which the vehicle moves.

3. A combination as claimed in claim 2 in which the beam scans in discrete steps and the encoded directional information correspondingly changes in stepwise manner with each movement of the beam.

4. A combination as claimed in claim 3 in which the beam is modulated at each step in the form of a sequential binary code exclusive to that step to provide the directional information.

5. A combination as claimed in claim 4 in which the code is a Gray code.

6. A combination as claimed in claim 1 in which the calculation means is adapted to determine the orientation of the vehicle by solving the equation:

$$\gamma = \tan^{-1}\left[\frac{M \sin \kappa}{1 + M \cos \kappa}\right]$$

where the three detectors are at positions C, D and A on the vehicle and the beacon is at a position B remote from the vehicle, and where M = CD sin $\beta$/DA sin $\alpha$ $\alpha$ is the angle subtended by CD at the beacon, $\beta$ is the angle subtended by DA at the beacon, $\kappa$ = angle CDA-($\alpha + \beta$), and $\gamma$ is the angle DAB, giving the orientation of DA to the bearing AB from A to the fixed station, CD, DA and angle CDA being known parameters of the vehicle, and $\alpha$ and $\beta$ being obtained from the directions of the light beams intercepted by the three detectors.

7. A combination as claimed in claim 1 in which the vehicle has four detectors mounted thereon in quadrilateral array to intercept light from the beacon.

8. A combination of a vehicle and a first beacon as claimed in claim 1 in which the vehicle can also move within a further area, a further beacon being located at a further fixed station and emitting light over the further area, for interception by the detectors, the light from the further beacon also being encoded with directional information and the decoding and calculating means being adapted to read the directional information from the further beacon in addition to that from the first beacon, and to calculate the position and orientation of the vehicle therefrom in essentially the same manner as for that from the first beacon, the further beacon emitting light which differs from that emitted by the first beacon so as to be identifiable by the vehicle.

9. A combination as claimed in claim 8 in which the directional information is provided in the form of a binary code, and the information identifying the beacons is given by further bits of the same binary code.

10. A combination as claimed in claim 8 in which the light emitted by each beacon is of a different colour from that emitted by the other, the beacon being thereby identifiable by the vehicle.

11. A combination as claimed in claim 8 in which the area over which light is emitted by the first beacon overlaps the further area.

* * * * *